Dec. 14, 1937. S. L. WEISS Re. 20,593
FAUCET CONNECTION
Original Filed Feb. 17, 1936
Fig. 1
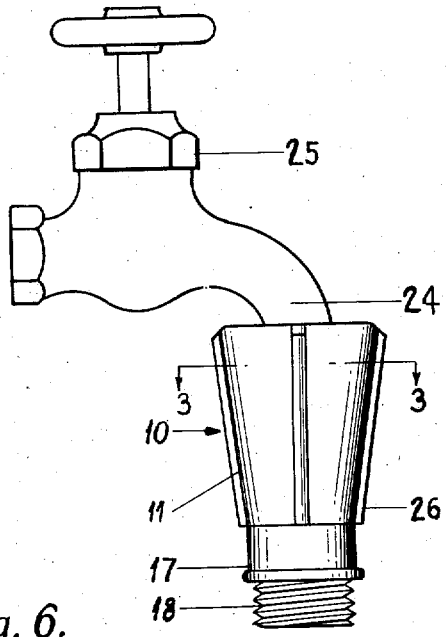
Fig. 2
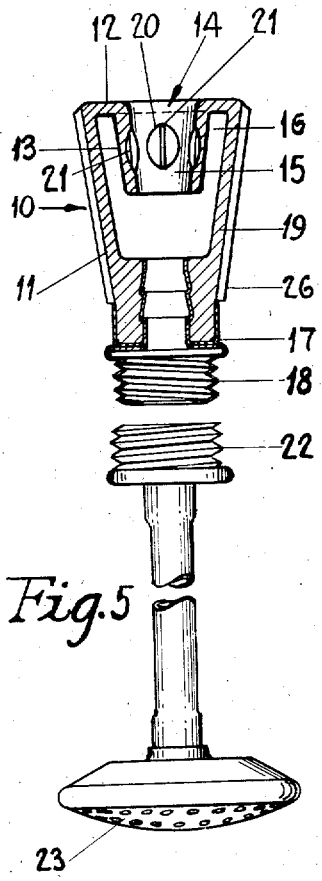
Fig. 6.
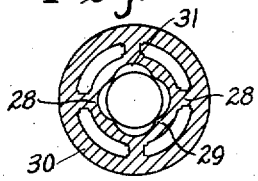
Fig. 3
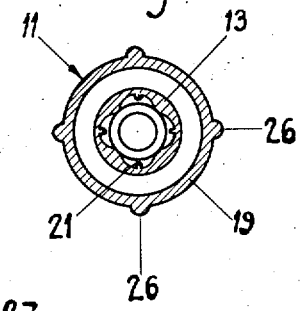
Fig. 5
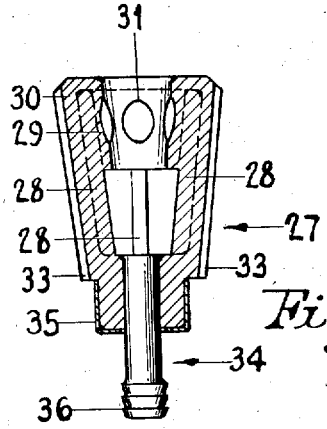
Fig. 4
SAMUEL L. WEISS
INVENTOR.
BY Joseph Blacker
ATTORNEY Reissued Dec. 14, 1937

Re. 20,593

UNITED STATES PATENT OFFICE 20,593

FAUCET CONNECTION

Samuel L. Weiss, Brooklyn, N. Y.

Original No. 2,085,841, dated July 6, 1937, Serial No. 64,197, February 17, 1936. Application for reissue October 28, 1937, Serial No. 171,592

3 Claims. (Cl. 285—90)

This invention relates to a faucet connection for attaching rubber tubes or garden hose to a faucet.

An object of this invention is to provide a faucet connection which will maintain its grip on a faucet nozzle even when supporting a heavy garden hose.

Another object of this invention is to provide a faucet connection made of rubber and having means for causing an augmented grip on the faucet nozzle.

Another object of this invention is to provide a faucet connection made of rubber and having means for causing the external air to effect an augmented grip on the faucet nozzle.

Another object of this invention resides in providing a faucet connection, such as is used for hydraulic purposes, wherein the pressure of the current, such as that of the fluid passing through, will act in conjunction with the elastic nature of the connection to automatically perform the function of a grip; the said connection comprising a hollow resilient body made of rubber having an integral inwardly extending sleeve positioned in annular spaced relation from said body and having ribs in said annular space to permit the hydraulic pressure to augment the gripping power of the resilient body on the faucet nozzle under all service conditions.

Another object resides in providing a faucet connection comprising a hollow resilient body made of rubber having an integral inwardly extending sleeve, and the said sleeve having a plurality of air pockets or suction cups to augment the gripping power of the resilient body.

Another object of this invention is to position the inner ribs connecting the said sleeve and the inner surface of the body of the device at the pocket areas so that pressure exerted by the hand of the user against the outer surface of body will be positively transmitted against the suction cups and cause the air to be expelled therefrom.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a side elevation of my faucet connection in operative position on a conventional faucet.

Figure 2 is a longitudinal sectional view of the faucet connection shown in Figure 1.

Figure 3 is a cross-sectional view of the faucet connection, the section being taken as on line 3—3 in Figure 1.

Figure 4 is a longitudinal sectional view of a modified form of faucet connection.

Figure 5 is a view of a spray nozzle and tubing, one end of the tubing having a threaded coupling designed to receive a screw threaded adapter on the device shown in Figures 1 and 2.

Figure 6 is a transverse cross-sectional view taken through the centers of the vacuum cups in Figure 4, with the external ribs omitted.

In the illustrated embodiment of the invention, shown in Figures 1 and 2, the numeral 10 indicates a faucet connection comprising a hollow tubular body or outer shell 11 which is preferably made of molded rubber, the rubber being slightly stiffened while retaining its elasticity.

As shown in Figure 2, the upper end of the body 11 has an inwardly extending annular flange 12 and an integral downwardly extending sleeve 13. The bore 14 of the sleeve 13 is made tapering with the smaller end 15 of the taper extending downwardly. The sleeve is not attached at its lower end to the outer shell 11 and is free to flex within the annular channel 16 surrounding it. The sleeve is thus free to adapt itself to different sizes of faucet nozzles as well as to different shapes of nozzles which may be entered into the bore 14.

The lower or discharge end 17 of the outer shell 11 may be provided with a screw threaded adapter 18 to facilitate its connection to a tube or hose having a screw-threaded sleeve at one end, as is well known in the art.

The wall thickness of the sleeve 13 and of the annular flange 12 is the same as that of the upper wall 19 of the body 11. While the bore 14 of the sleeve 13 tapers downwardly, the wall thickness of the sleeve is constant except where vacuum cups are provided, as will be described.

As is well known in the art, under operating water pressure conditions, the water pressure within the channel 16 of the shell 11 reacts against the elastic sleeve 13 and clamps the sleeve against the faucet nozzle. As shown in Figures 1 and 2, the discharge end 17 has a screw-threaded adapter 18 used for receiving a threaded coupling 22 (Figure 5) attached to a spray nozzle 23. The hose may be heavier than spray tubing and cause the faucet connection to lose its grip on the faucet nozzle. For the purpose of augmenting the grip of the faucet connection on the faucet nozzle, I have provided a plurality of air pockets 20 in the sleeve 13, known as vacuum or suction cups. As shown in Figure 3, the cups are substantially in adjoining relation and diametrically in alinement.

When the faucet connection 10 is gripped in the hand of the user, the hand pressure is transmitted internally against the said suction cups and causes the rubber cups to be substantially equally and jointly flattened against the nozzle. This pressure causes the air normally in the cups to be forced out therefrom into the lower end of the device and to flow out through the attached hose. The grip of the faucet connection on the faucet nozzle is thus augmented by atmospheric pressure transmitted to the sleeve by reason of reduced pressure within the suction cups. I may provide a radially projecting rib 21 centrally of each cup, the said ribs being of less height than the depth of the cups. When the hand of the user grips the shell 11 for attaching the faucet connection 10 to a nozzle 24 of a faucet 25, he causes a circumferential twisting pressure on the shell. This twist causes the ribs 21 to move away from their radial positions and to permit the suction cups 20 to be flattened against the nozzle 24 and cause the escape of the air normally therein.

I may provide longitudinal or axially positioned ribs 26 on the outer surface of the shell 11 to secure a better grip on the shell.

Figure 4 shows a modified faucet connection 27 similar to the faucet connection 10 shown in Figures 1 to 3 inclusive, but having ribs 28, 28, connecting the sleeve 29 with the outer shell 30. The ribs 28 and the cups 31 are in diametrical alinement in the shell 30 with outer ribs 33 which are axially positioned on the outer surface of the shell 30. The discharge end 34 has a metal sleeve 35 and a central nipple 36 upon which may be secured a rubber tube.

It is to be noted that when a faucet nozzle of large external diameter is inserted into the internally tapering sleeve 13 that when the said nozzle reaches the small lower end of the sleeve, the walls of the sleeve at this point may be stretched to such an extent as to completely close the entrance into the annular channel 16. In such an event this closing of the lower end of the channel 16 will prevent the water from entering the channel and will prevent the water pressure from augmenting the grip of the sleeve 13 on the nozzle. The ribs 28, 28 connecting the sleeve 29 with the outer shell 30 prevent such an occurrence by causing enlargement of the outer shell concomitantly with the enlargement of the sleeve.

Due to the thin upper connecting wall 12 which is of the same thickness as the sleeve 13 and the wall 19 of the body 11, the channel 16 is of maximum height and this produces a long gripping surface on the nozzle.

In accordance with the patent statutes I have described and illustrated two embodiments of my invention, but it will be understood that various changes can be made therein without departing from the spirit of the invention as defined by the appended claims.

I claim:

1. A detachable coupling for securely connecting a hose to a faucet, comprising a rubber body having an outer shell adapted at the lower end for connection to a hose, the upper end of said body having an inwardly extending annular flange, said flange having a downwardly extending sleeve, said sleeve having spaced air pockets intermediate its upper and lower ends and forming suction cups for gripping a faucet nozzle, a plurality of longitudinal ribs connecting said sleeve and the inner surface of said outer shell, and the said inner ribs and said suction cups being diametrically in alinement.

2. A faucet connector for heavy hose, comprising a rubber body having an outer shell adapted at the lower end for connection to a hose, the upper end of said body having an annular flange and a downwardly extending sleeve, said sleeve having air pockets in diametrically opposed relation, said pockets being adapted to be flattened by external manual pressure, and means in diametrical alinement with said pockets and positioned intermediate said sleeve and the inner surface of said outer shell for flattening said pockets when said outer shell is gripped by a human hand.

3. In a detachable coupling for securely connecting a hose to a faucet, comprising a rubber body having an outer shell adapted at the lower end for connection to a hose, the upper end of said body having an inwardly extending annular flange, said flange having a downwardly extending sleeve spaced from said shell, and a plurality of longitudinal ribs connecting said sleeve and the inner surface of said outer shell in said spaced relation.

SAMUEL L. WEISS.